Jan. 29, 1963  A. E. BRATT  3,075,278
CAGE FOR ROLLING BEARINGS
Filed May 27, 1960

INVENTOR:
AXEL ERLAND BRATT
BY Howson & Howson
ATTYS.

United States Patent Office 3,075,278
Patented Jan. 29, 1963

3,075,278
CAGE FOR ROLLING BEARINGS
Axel Erland Bratt, Goteborg, Sweden, assignor to Aktiebolaget Svenska Kullagerfabriken, Goteborg, Sweden, a corporation of Sweden
Filed May 27, 1960, Ser. No. 32,422
Claims priority, application Sweden June 3, 1959
5 Claims. (Cl. 29—148.4)

The present invention relates to a cage for rolling bearings which comprises a pair of annular portions interconnected by cross-pieces which at least in part are spaced from each other a distance which is less than the diameter of the pertinent part of the rolling bodies, for instance by tongues or the like, and thereby retain the rolling bodies in place in the cage in at least one radial direction. In known cages of this general type one of the following principles is applied:

(a) The cage, usually comprises two separate annular portions of which at least one is provided with axially directed cross-pieces, is assembled in its final position in the bearing;

(b) The cross-pieces are provided with resilient portions such as tongues or the like which flex resiliently when the rollers are being introduced into their pockets between the cross-pieces;

(c) The cross-pieces are themselves resilient and permit the introduction of rollers into the pockets.

A roller bearing according to the invention, on the other hand, is characterized thereby that the parts of the said annular portions located between the cross-pieces are so elastically flexible that the said cross-pieces and tongues may be turned aside through elastic flexing in a radial direction of the said parts, whereby the rolling bodies may be inserted in a radial direction past the said tongues into the pockets.

Figure 1:
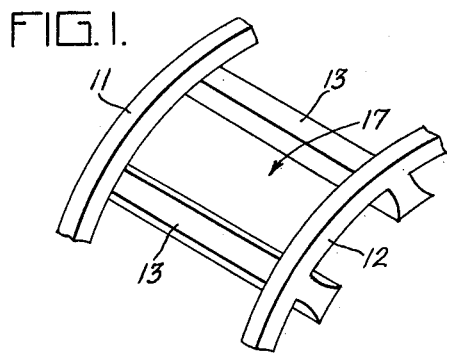
Figure 2:
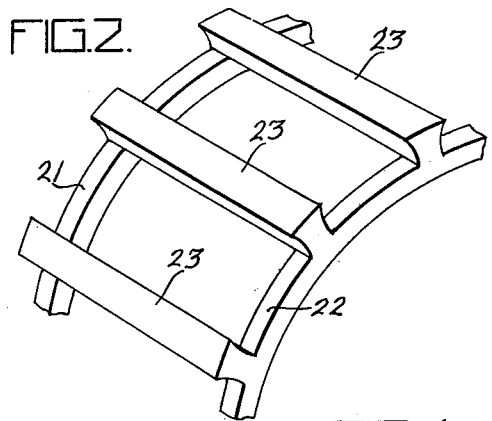
Figure 3:
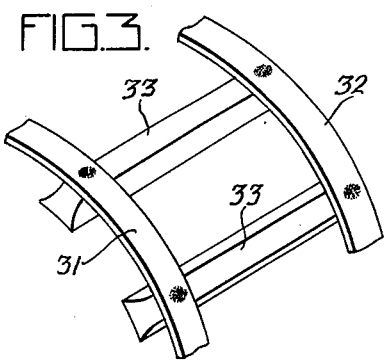
Figure 4:
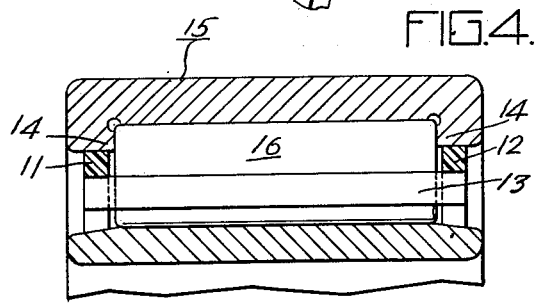
Figure 7:
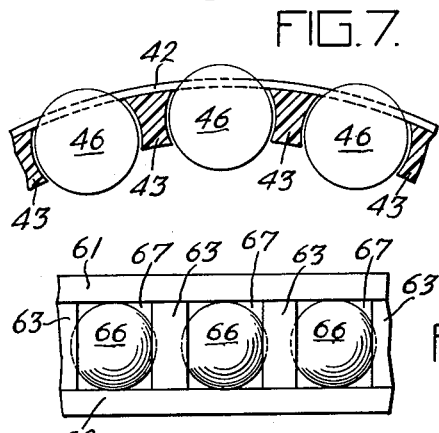
Figure 6:
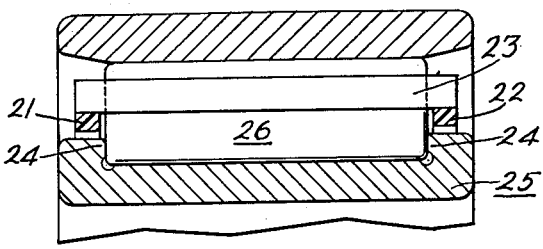
Figures 5, 9:
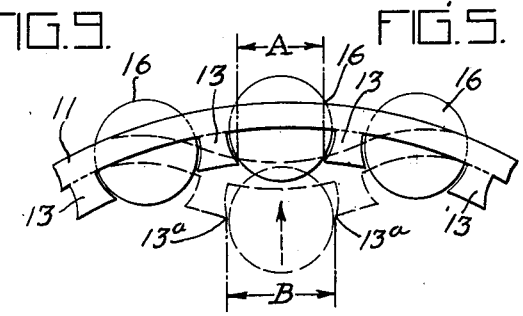
Figure 8:
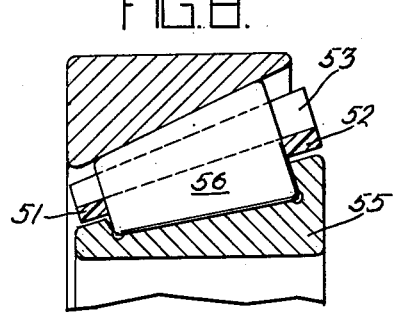

The invention is described in connection with the accompanying drawings in which FIG. 1 is a view in perspective of a portion of a cage for a roller bearing having flanges on the outer race ring and FIG. 2 is a similar view of a cage for a bearing having flanges on the inner race ring. Both of these cages are preferably made of a suitable plastic. FIG. 3 is a view in perspective of a portion of a cage made of metal, preferably a weldable metal. FIG. 4 is a cross section through a roller bearing with a cage according to FIG. 1, and FIG. 5 illustrates the manner in which the annular portions of the cage between the cross-pieces are elastically flexed when a roller is being introduced into the cage. FIG. 6 shows a cross section of a roller bearing having a cage according to FIG. 2. FIG. 7 is a section in a diametrical plane of a form of bearing according to the invention in which the rollers and the cage form a self-contained unit. FIGS. 8 and 9 show the invention applied to a taper roller bearing and to a ball bearing respectively.

In FIGS. 1, 4 and 5 the numerals 11 and 12 designate two annular portions of a cage. These are interconnected by cross-pieces 13, the purpose of which is to retain the rollers in the cage and to separate and guide them. When assembling a bearing with a cage of this kind, the cage is first placed within the outer race ring 15 which has a pair of flanges 14, after which the rollers 16 are inserted past the cross-pieces 13 into their pockets 17. However, since the smallest distance "A" between the portions 13a of the cross-pieces closest to each other on the cross-pieces which form the roller pocket in question is less than the diameter of the roller, the parts of the annular portions 11 and 12 between the cross-pieces are made flexible. It is thus possible by elastically flexing these parts as shown by chain lines in FIG. 5 to turn both cross-pieces aside in opposite directions to increase the distance between them to a dimension "B" which is great enough to open up a passage sufficiently wide to enable the roller to pass freely between them into the roller pocket, although in certain cases, it may be necessary to snap the roller into place. When all the rollers have been introduced into their pockets, the outer race ring, the rollers and the cage form a self-contained unit. The cage can be centered in the bearing preferably in two different ways either by dimensioning the annular portions 11 and 12 to slide on the flanges 14 of the outer race ring 15 or by permitting the cross-pieces 13 to ride on the rollers.

FIGS. 2 and 6 show a somewhat different form of a cage for a cylindrical roller bearing having flanges 24 on the inner race ring 25. The annular portions are designated 21 and 22 and the cross-pieces 23. In this case the inner race ring 25, the rollers 26 and the cage form a unit, when the rollers 26 have been inserted into their pockets by passing them between the cross-pieces 23 by elastically flexing the parts of the annular portions 21 and 22 between the cross-pieces 23. The above described cages are preferably made of a suitable plastic, for example a polyamide or a polytetrafluoroethylene or the like. The invention is, however, not confined to cages of plastic. FIG. 3 thus illustrates a form of the inventon in which the cross-pieces 33 are spot welded to a pair of metallic rings 31, 32, which are elastically flexible between the cross-pieces.

FIG. 7 illustrates a form of the invention in which the cage and rollers form a unit. The cross-pieces 43 are connected to rings 42, the inner diameter of which is greater than the pitch diameter of the set of rollers. The set of rollers will therefore be self-contained, since a roller 46 which has been inserted in an outwards direction between two adjacent cross-pieces 43 is prevented from falling out of its pocket because the least distance between two adjacent cross-pieces at their outer surfaces is less than the diameter of the roller. In this form of the invention, the rings may alternatively be located inside of the cross pieces.

In the form of the invention shown in FIG. 8, the cage is intended for taper rollers 56. These are snapped outwardly into their pockets and form a unit with the inner ring 55 and the cage, which latter comprises rings 51 and 52 and cross-pieces 53.

FIG. 9 shows the manner in which the invention may be applied to a ball bearing. Balls 66 are introduced into their pockets 67 which are formed by two rings 61 and 62 and the cross-pieces 63 interconnecting them.

I claim:

1. A method for assembling rolling elements in a rolling bearing consisting of the steps of providing a cage having a pair of annular portions made of a resilient flexible material and a plurality of cross pieces connecting the annular portions and spaced apart to provide circumferentially spaced pockets for the rolling elements, each of said cross pieces having a tongue projecting radially of the annular portions, the spacing between the tips of adjacent tongues remote from the annular portions being less than the diameter of one of the rolling elements to retain them in the pockets in one radial direction, providing means for retaining the rolling elements in a radial direction opposite said one radial direction, flexing said annular portions radially to increase the spacing between the tips of adjacent tongues to permit insertion of the rolling elements into the pockets and then inserting a rolling element into each of the pockets in a radial direction through the adjacent tongues forming the pockets.

2. A method for assembling rolling elements in a rolling bearing including a race ring consisting of the steps of providing a cage having a pair of annular portions made of a resilient flexible material and a plurality of cross pieces connecting the annular portions and spaced apart to provide circumferentially spaced pockets for the rolling elements, each of said cross pieces having a tongue projecting radially of the annular portions, the spacing between the tips of adjacent tongues remote from the annular portions being less than the diameter of one of the rolling elements to retain them in the pockets in one radial direction, disposing the cage concentrically of the race ring to provide means for retaining the rolling elements in a direction opposite said one radial direction, flexing said annular portions to increase the spacing between the tips of adjacent tongues to permit insertion of the rolling elements into the pockets and then inserting a rolling element into each of the pockets in a radial direction through the adjacent tongues forming the pockets.

3. A method for assembling rolling elements in a rolling bearing including an outer race ring consisting of the steps of providing a cage having a pair of annular portions made of a resilient flexible material and a plurality of cross pieces connecting the annular portions and spaced apart to provide circumferentially spaced pockets for the rolling elements, each of said cross pieces having a tongue projecting radially inwardly of the annular portions, the spacing between the tips of adjacent tongues remote from the annular portions being less than the diameter of one of the rolling elements to retain them in the pockets in a radially inward direction, disposing the cage within and concentrically of the outer race ring to provide means for retaining the rolling elements in a radially outward direction, flexing said annular portions to increase the spacing between the tips of adjacent tongues to permit insertion of the rolling elements into the pockets and then inserting a rolling element into each of the pockets in a radial direction through adjacent tongues forming the pockets.

4. A method for assembling rolling elements in a rolling bearing including an inner race ring consisting of the steps of providing a cage having a pair of annular portions made of a resilient flexible material and a plurality of cross pieces connecting the annular portions and spaced apart to provide circumferentially spaced pockets for the rolling elements, each of said cross pieces having a tongue projecting radially outwardly of the annular portions, the spacing between the tips of adjacent tongues remote from the annular portions being less than the diameter of one of the rolling elements to retain them in the pockets in a radially outward direction, positioning the cage over and concentrically of the inner race ring to provide means for retaining the rolling elements in a radially inward direction, flexing said annular portions to increase the spacing between adjacent tongues to permit insertion of the rolling elements into the pockets and then inserting a rolling element into each of the pockets in a radial direction through adjacent tongues forming the pockets.

5. A method for assembling rolling elements in a rolling bearing consisting of the steps of providing a cage having a pair of annular portions made of a resilient flexible material and a plurality of cross pieces connecting the annular portions and spaced apart to provide circumferentially spaced pockets for the rolling elements, each of said cross pieces having a tongue projecting radially of the annular portions, the spacing between the tips of adjacent tongues remote from the annular portions and the spacing between portions of the tongues proximate to said annular portions being less than the diameter of one of the rolling elements to retain them against radial movement in the pockets, flexing said annular portions radially to increase the spacing between the tips of adjacent tongues to permit insertion of the rolling elements into the pockets and then inserting a rolling element into each of the pockets in a radial direction through the adjacent tongues forming the pockets.

References Cited in the file of this patent

UNITED STATES PATENTS

| | | |
|---|---|---|
| 1,928,823 | Young | Oct. 3, 1933 |
| 2,267,863 | Hickling | Dec. 30, 1941 |
| 2,534,379 | Schreiber | Dec. 19, 1950 |
| 2,741,015 | Young | Apr. 10, 1956 |
| 2,765,202 | Barr et al. | Oct. 2, 1956 |
| 2,911,268 | Staunt | Nov. 3, 1959 |

FOREIGN PATENTS

| | | |
|---|---|---|
| 993,520 | France | July 25, 1951 |
| 796,428 | Great Britain | June 11, 1958 |